US012083617B2

(12) United States Patent
Ternovsky et al.

(10) Patent No.: US 12,083,617 B2
(45) Date of Patent: Sep. 10, 2024

(54) WELDING ELECTRODE WITH RADIAL-SERRATED WELD FACE AND METHOD OF FORMING AND REFORMING WELD FACE

(71) Applicant: MAGNA INTERNATIONAL INC., Aurora (CA)

(72) Inventors: Oleg Ternovsky, Vaughan (CA); Craig James Varley, Belwood (CA)

(73) Assignee: MAGNA INTERNATIONAL INC., Aurora (CA)

( * ) Notice: Subject to any disclaimer, the term of this patent is extended or adjusted under 35 U.S.C. 154(b) by 441 days.

(21) Appl. No.: 16/652,166

(22) PCT Filed: Oct. 11, 2018

(86) PCT No.: PCT/CA2018/000192
§ 371 (c)(1),
(2) Date: Mar. 30, 2020

(87) PCT Pub. No.: WO2019/071334
PCT Pub. Date: Apr. 18, 2019

(65) Prior Publication Data
US 2020/0246907 A1 Aug. 6, 2020

Related U.S. Application Data

(60) Provisional application No. 62/570,840, filed on Oct. 11, 2017.

(51) Int. Cl.
*B23K 11/30* (2006.01)
*B21D 53/00* (2006.01)
(Continued)

(52) U.S. Cl.
CPC .......... *B23K 11/3009* (2013.01); *B21D 53/00* (2013.01); *B23K 11/12* (2013.01);
(Continued)

(58) Field of Classification Search
CPC ....... B23K 11/00; B23K 11/185; B23K 11/12; B23K 11/30; B23K 11/3063;
(Continued)

(56) References Cited

U.S. PATENT DOCUMENTS 1,882,008 A * 10/1932 Head ..................... B23F 21/18
407/23
2,379,187 A * 6/1945 Richards ............ B23K 11/3009
219/119
(Continued)

FOREIGN PATENT DOCUMENTS

CN 104227225 A 12/2014
CN 104520037 A 4/2015
(Continued)

OTHER PUBLICATIONS

European Search Report from the European Patent Office for corresponding European Patent Application No. 18866926.1 dated Jun. 8, 2021, 7 pages.
(Continued)

*Primary Examiner* — Vy T Nguyen
(74) *Attorney, Agent, or Firm* — Dickinson Wright PLLC

(57) ABSTRACT

A welding electrode for an electric resistance welding process. The welding electrode includes a body extending along a center axis and terminating axially at a weld face for contacting a work face. The weld face defines a center along the axis and defines an outer edge spaced radially from the center. A plurality of senates are defined along the weld face. Each of the serrates projects axially away from the weld face and extends radially from the center axis to the outer edge of the weld face. A higher density of the plurality of serrates is formed proximate to the center axis than proximate to the (Continued)

outer circumference of the weld face. Methods for using the welding electrode and forming the senates on the welding electrode are also provided.

18 Claims, 5 Drawing Sheets

(51) Int. Cl.
    *B23K 11/12*      (2006.01)
    *B23K 11/18*      (2006.01)
    *B23K 101/00*      (2006.01)
    *B23K 103/08*      (2006.01)
    *B23K 103/10*      (2006.01)

(52) U.S. Cl.
    CPC ........ *B23K 11/185* (2013.01); *B23K 11/3063* (2013.01); *B23K 2101/006* (2018.08); *B23K 2103/10* (2018.08); *B23K 2103/15* (2018.08)

(58) Field of Classification Search
    CPC ............ B23K 11/3009; B23K 35/0205; B23K 11/115; B23K 11/20; B23K 11/3018; B23K 11/314; B23K 2101/006; B23K 11/14; B23K 11/166; B23K 11/3081; B23K 2101/18; B23K 2101/185; B23K 2101/34; B23K 2103/20; B23K 35/0261; B23B 5/166; B23F 21/18; B23F 21/00; B32B 15/016; C22C 21/00; C22C 1/04; B22F 5/00
    USPC ...................... 219/119, 117.1 OR, 78; 407/23
    See application file for complete search history.

(56) References Cited

U.S. PATENT DOCUMENTS

| | | | | |
|---|---|---|---|---|
| 2,641,670 A | * | 6/1953 | Graves, Jr. | ........... H01H 1/0233 200/266 |
| 2,694,126 A | * | 11/1954 | Binstock | .............. H01H 1/0231 252/514 |
| 3,863,337 A | * | 2/1975 | Schreiner | ............. H01H 1/0233 200/264 |
| 3,864,827 A | * | 2/1975 | Schreiner | ............. H01H 1/0233 200/264 |
| 4,342,893 A | * | 8/1982 | Wolf | .................... H01H 11/045 428/673 |
| 4,591,687 A | * | 5/1986 | Urech | ................ B23K 35/0205 219/93 |
| 6,091,044 A | * | 7/2000 | Larranaga | ............ B23K 1/0004 219/85.14 |
| 8,833,215 B2 | | 9/2014 | Sigler et al. | |
| 9,440,305 B2 | * | 9/2016 | Sigler | ..................... B23B 5/166 |
| 2006/0081563 A1 | * | 4/2006 | Ueda | .................. B23K 11/3081 219/119 |
| 2008/0078749 A1 | | 4/2008 | Sigler et al. | |
| 2009/0127232 A1 | | 5/2009 | Sigler et al. | |
| 2009/0291322 A1 | * | 11/2009 | Watanabe | ............. B32B 15/012 428/653 |
| 2009/0302009 A1 | * | 12/2009 | Sigler | ................ B23K 35/0205 219/119 |
| 2011/0240605 A1 | * | 10/2011 | Takayama | .............. B23K 11/36 219/86.1 |
| 2013/0015164 A1 | * | 1/2013 | Sigler | .................. B23K 35/302 219/87 |
| 2013/0020288 A1 | * | 1/2013 | Moision | ................. B23K 11/25 219/108 |
| 2017/0282303 A1 | | 10/2017 | Wang et al. | |

FOREIGN PATENT DOCUMENTS

| | | |
|---|---|---|
| GB | 620227 A | 3/1949 |
| JP | H04339573 A | 11/1992 |
| JP | H0957460 A | 3/1997 |

OTHER PUBLICATIONS

Chinese Office Action and Search Report from the Chinese Patent Office for corresponding Chinese Patent Application No. 201880066354.2 dated Jun. 7, 2021, 10 pages.

* cited by examiner

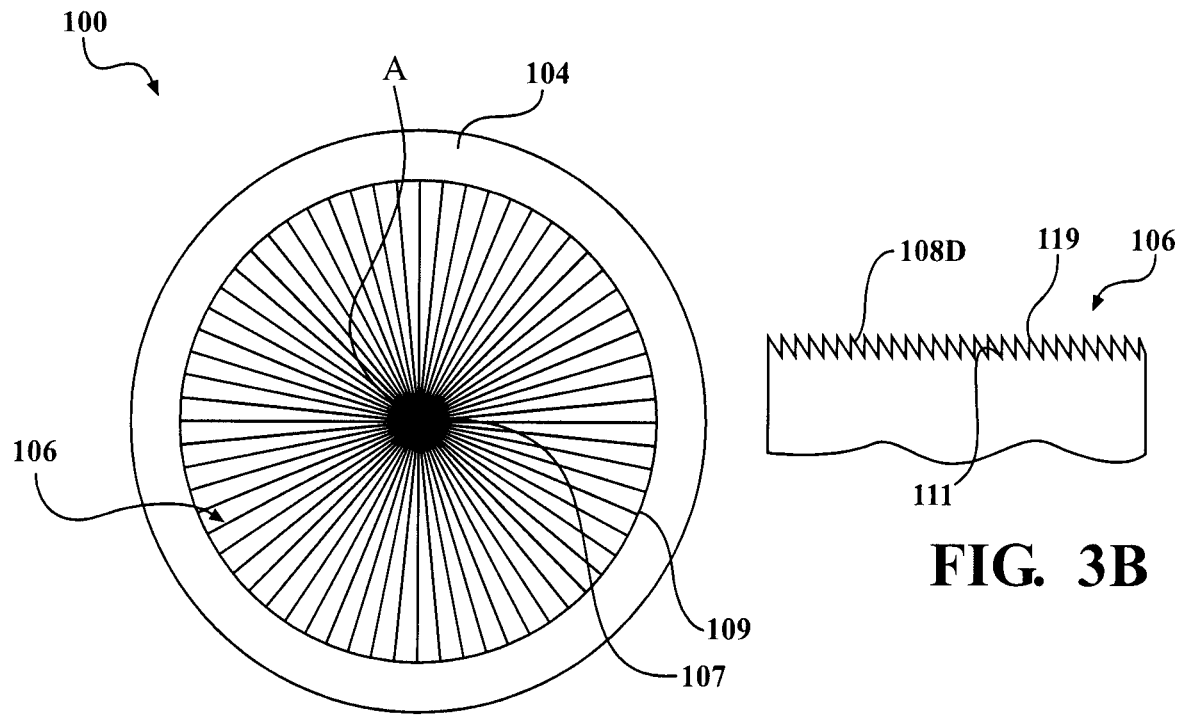
FIG. 3A
FIG. 3B
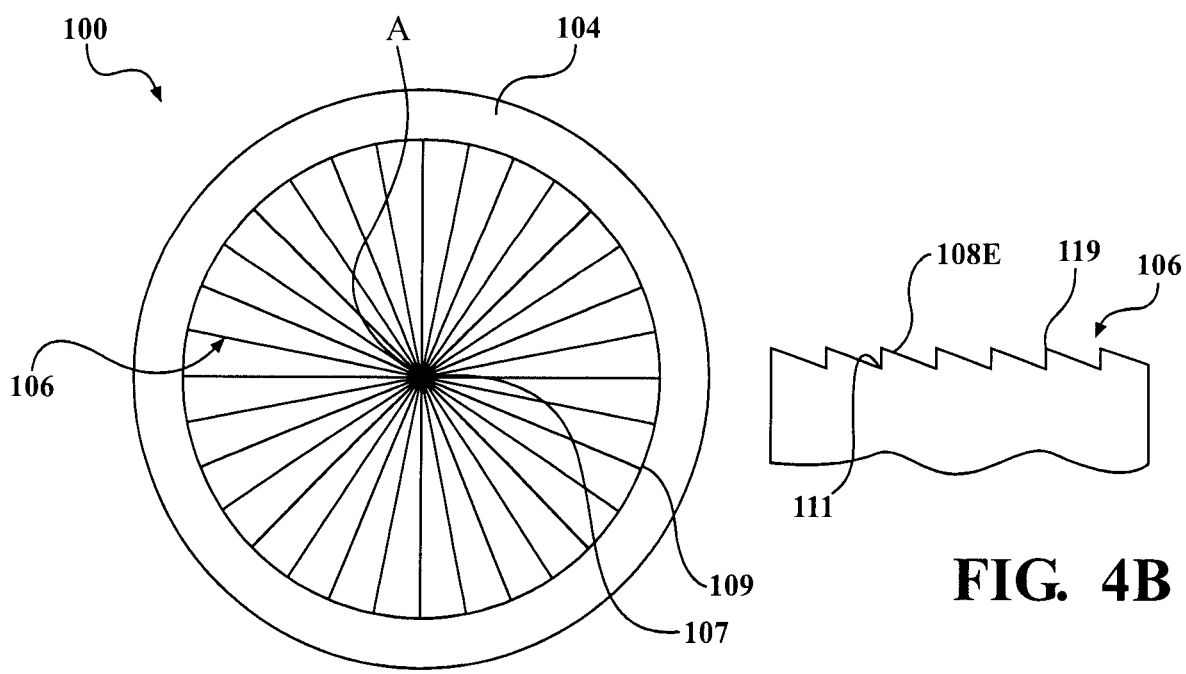
FIG. 4A
FIG. 4B

WELDING ELECTRODE WITH RADIAL-SERRATED WELD FACE AND METHOD OF FORMING AND REFORMING WELD FACE

CROSS-REFERENCE TO RELATED APPLICATIONS

This U.S. National Stage Patent Application claims the benefit of PCT International Patent Application Serial No. PCT/CA2018/000192 filed Oct. 11, 2018 entitled "Welding Electrode With Radial-Serrated Weld Face And Method Of Forming And Reforming Weld Face" which claims the benefit of U.S. Provisional Patent Application Ser. No. 62/570,840 filed on Oct. 11, 2017, and titled "Welding Electrode with Radial-Serrated Weld Face and Method of Forming and Reforming Weld Face", the entire disclosures of the applications being considered part of the disclosure of this application and hereby incorporated by reference.

BACKGROUND

1. Field of the Invention

The present disclosure relates generally to a welding electrode for resistance welding and a dressing tool for forming and reforming a weld face of the welding electrode. More particularly, the present disclosure relates to an improved welding electrode that provides improved electrical conductivity between the welding electrode and a welding surface due to radial-serrates formed in the weld face, and a dressing tool for forming the radial-serrates.

2. Related Art

This section provides background information related to the present disclosure that is not necessarily prior art.

Aluminum spot welding applications, including the manufacture of vehicle components, such as doors, deck lids, and lift gate are often formed using inner and outer sheet metal panels. The panels are formed into a variety of shapes, such as complex curvatures and include electrical wiring and/or hardware between the inner and outer metal panels. The formed panels usually have flanges at peripheral edges for attachment. The inner metal panel is positioned against the outer metal panel and other metal parts, such as a workpiece, for attachment. The workpiece is positioned for a formation of a series of electric resistance welds along the flanges. The assembled panels may be positioned between welding arms of a stationary pedestal welding machine. The assembled panels may also be in a fixed position for a welding gun to move around the workpiece and flanges to form the welds. The welding apparatus provides a welding current to the welding electrodes to briefly melt the metal layers of the workpiece and flanges located between the electrodes and form a weld nugget to join the metal layers. Accordingly, electric resistance welding may be used to attach the one or more inner and outer sheet metal panels and the workpiece.

A weld face (or welding electrode cap) of a welding electrode can be used for forming spot welds in metal workpieces, such as for welding light metal workpieces like aluminum alloy or magnesium alloy sheet materials. The combination of the high electrical and thermal conductivity together with oxides that often naturally form on the surface of the alloys can cause problems for spot welding. For example, the oxide film can increase the temperature of the welding electrode, which can decreases its life span and prevent strong electrical conductivity between the welding electrode and a welding surface. If strong electrical conductivity is not provided, the weld face may not properly engage and pierce the multiple layers of metal panels. The life expectancy of the welding electrode and the process of forming weld nuggets on the workpiece correlates with electrical conductivity between the welding electrode and the welding surface. The electrical conductivity is directly related to the condition of the oxide film, such as its thickness and chemical components.

The weld face may be designed to pierce the oxide film during the welding process so that a strong electrical conductivity can be achieved. Some techniques used improve the welding process include using welding electrodes having weld faces with randomly positioned grooves or serrates. Serrates are used to penetrate an oxide film on the workpiece surface and reduce overheating at the contact surface of the welding electrode with the welding material. However, after several spot welds, the weld faces are often altered by erosion or buildup of the workpiece material. The alteration of the weld faces prevents the welding electrode from working properly and providing consistent welds (such as nugget size and location). When the welding electrode is not working properly (e.g., not disrupting the oxide film), it is known to stop the manufacturing process for the weld faces to be cleaned, reshaped, redressed, or replaced.

SUMMARY

This section provides a general summary of the present disclosure and is not a comprehensive disclosure of its full scope or all of its features, aspects, and objectives.

Accordingly, it is an objective of the present invention to provide a welding electrode that reliably and consistently provides welding operations.

It is another objective of the present invention to provide a welding electrode that may easily be refinished after wear or the buildup of oxides on the weld face.

It is another objective of the present invention to provide a simple and effective method of electric resistance welding.

It is another object of the present invention to provide a simple, effective and repeatable method of forming serrates on a weld face.

According to these and other objectives, a welding electrode for an electric resistance welding process is provided. The welding electrode includes a body extending along a center axis and terminating axially at a weld face for contacting a work piece. The weld face defines a center along the axis and defines an outer edge spaced radially from the center. A plurality of serrates are defined along the weld face. Each of the serrates projects axially away from the weld face and extends radially from the center axis to the outer edge of the weld face. A higher density of the plurality of serrates is formed proximate to the center axis than proximate to the outer circumference of the weld face.

Also in accordance with the aforementioned and other objectives, a method for using a welding electrode for electric resistance welding on a workpiece is provided. The welding electrode comprises a body extending about and along an axis and terminating axially at a weld face having a plurality of serrates for contacting the workpiece. A higher density of serrates is formed proximate to a center of the weld face than proximate to an edge of the weld face. The method includes pressing the weld face axially against the work piece to drive the serrates into the work piece to disrupt an oxide film on the work piece. The method also includes forming an electrical resistance weld on the work piece with the welding electrode.

Also in accordance with the aforementioned and other objectives, a system for forming a weld face of a welding electrode is provided. The system includes a dressing tool being rotatable about an axis and having a blade configured to overly the weld face of the electrode. An actuator is coupled with the dressing tool and is configured to apply a rotational force in a rotary direction about the axis to the dressing tool, and configured to apply an axial force against the dressing tool to cause the blade to engage and form serrates on the weld face.

Also in accordance with the aforementioned and other objectives, a method for forming or reforming a radial-serrated shape in a weld face of a welding electrode is provided. The welding electrode extends about and along an axis and terminates axially at the weld face. The method includes rotating the dressing tool about the axis to cause the dressing tool to rotate about the welding electrode. The method also includes pressing the dressing tool axially against the work piece to drive the dressing tool against work piece to form serrates on the weld face.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3A is a top view of a welding electrode including a fifth embodiment of radial-serrates;

FIG. 3B is a sectional view of the fifth embodiment of radial serrates of FIG. 3A taken from adjacent to a center of the weld face;

FIG. 4A is a top view of a welding electrode including a sixth embodiment of radial-serrates;

FIG. 4B is a sectional view of the sixth embodiment of radial serrates of FIG. 4A taken from adjacent to an edge of the weld face;

DETAILED DESCRIPTION

The following description is merely exemplary in nature and is not intended to limit the disclosure in its application or uses. For purposes of clarity, the same reference numbers are used in the description and drawings to identify similar elements.

Figure 1:
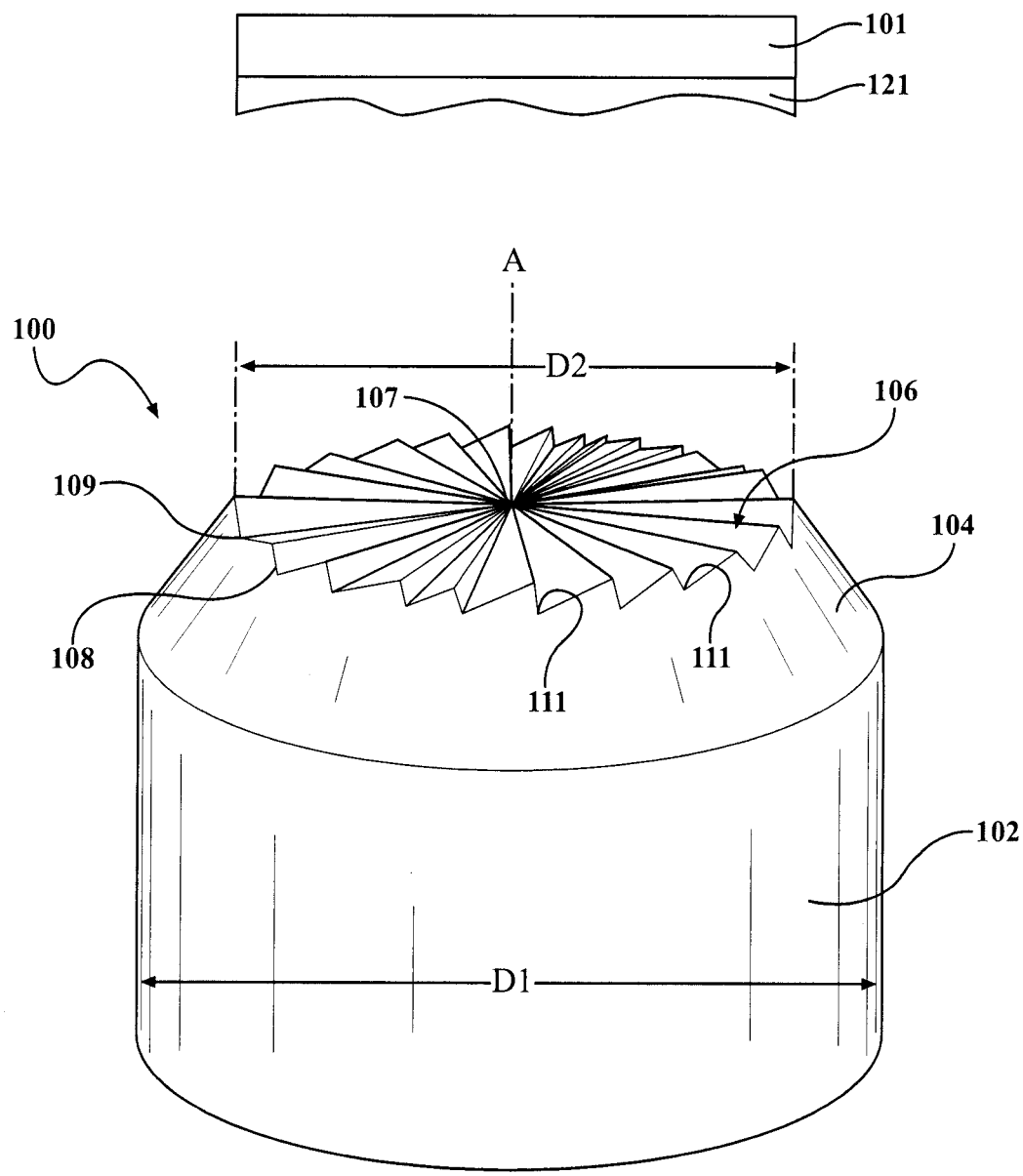
FIG. 1 is a perspective view of a welding electrode having a first embodiment of radial serrates on a weld face.

FIG. 1 illustrates a welding electrode 100 for an electric resistance welding application. The welding electrode 100 has a generally cylindrical body 102 that extends about and along an axis A and terminates axially at a weld face 106. The weld face 106 is axially spherically crowned. The weld face 106 defines a center 107 along the axis A and an outer edge 109 that is spaced radially from the center 107. According to the example embodiment, the weld face 106 is circular and thus the outer edge 109 is an outer circumference of the weld face 106. A tapered head 103 is defined axially between the body 102 and the weld face 106. The tapered head 103 extends axially and tapers radially inwardly between the body 102 and the weld face 106 such that a first diameter D1 of the body 102 is larger than a second diameter D2 of the weld face 106. It should be appreciated that various diameters could be utilized, but the first diameter D1 of the body 102 should be at least equal to, or greater than the second diameter D2 of the weld face 106. The body 102 of the welding electrode 100 is made of a high strength material such that it is strong enough to withstand a welding force applied to the welding electrode 100 during the welding process. The tapered head, or head 104, may be cone shaped until it is cut to form the weld face 106 for the welding process. Once formed, the weld face 106 has a radial-serrated surface with radial teeth, or serrates 108 projecting axially from the weld face 106 and extending radially from the center 107 to the outer edge 109 of the weld face 106. As will be described in greater detail below, the serrates 108 have a specific shape and contact area for making a connection with a welding material or workpiece 101 (schematically shown in FIG. 1).

Figure 2:
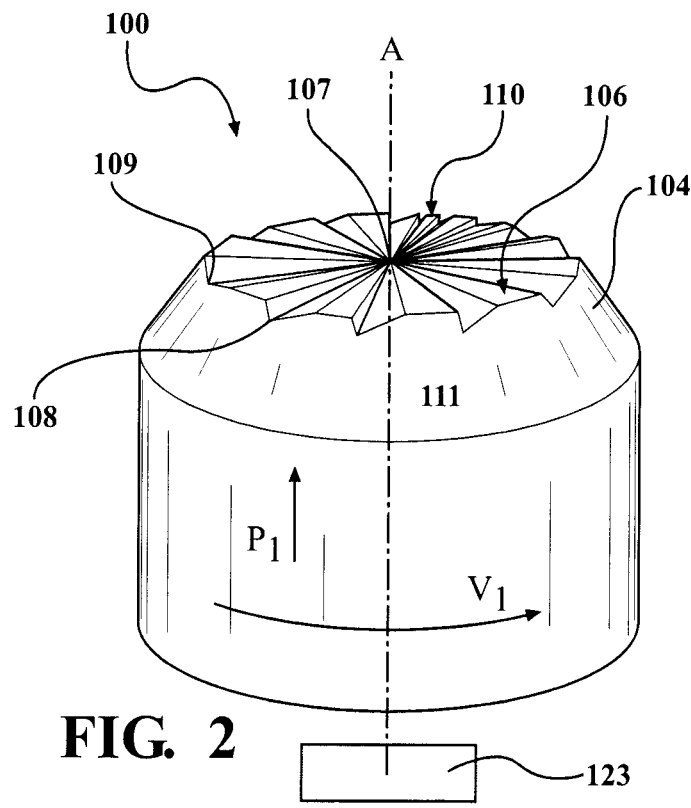
FIG. 2 is a perspective view of a welding electrode having a second embodiment of radial serrates on the weld face.
Figure 2A:
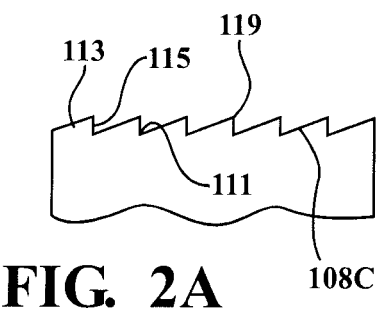
FIG. 2A is a sectional view of the first embodiment of radial serrates.
Figure 2B:
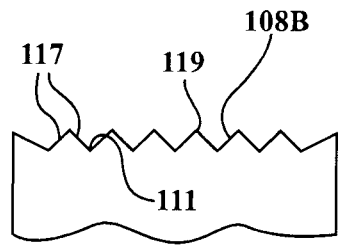
FIG. 2B is a sectional view of a third embodiment of radial serrates.
Figure 2C:
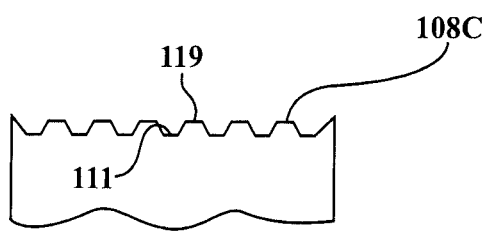
FIG. 2C is a sectional view of a fourth embodiment of radial serrates.

FIGS. 2-2C show the welding electrode 100 and sectional views of radial-serrates 108 formed in the weld face 106. As shown, because the serrates 108 extend radially from the center 107 to the outer edge 109 of the weld face 106, a higher density of the serrates 108 is formed proximate to the center 107 than to the outer edge 109 of the weld face 106. As further shown, each of the plurality of serrates 108 are separated from one another by one of a plurality of valleys 111 extending axially into the weld face 106. More particularly, each of the serrates 108 is partially defined by, and located between a pair of the valleys 111.

As illustrated by serrates 108A-108E in FIGS. 2A-2C, 3B and 4B, the serrates 108 may have different shapes or patterns. For example, serrates 108A each have an angled surface 113 protruding upward from the weld face 106 and a vertical surface 115 approximately parallel to the axis A of the welding electrode 100. Serrates 108B each have two slanted sides 117 that form peaks 119 and valleys 111 about the weld face 106, e.g., in a saw-tooth pattern where the peaks 119 and valleys 111 are "V"-shaped. Serrates 108C are similar to serrates 108B except that the peaks 119 and valleys 111 are "flat" or "U"-shaped and the pattern resembles a sinusoidal shape. As will be discussed in greater detail below, the shape, pattern, and density of the serrates 108 in the weld face 106 may be selectively chosen and formed based on properties and conditions of the work piece 101 and an oxide film 121 on the work piece 101 (schematically shown in FIG. 1).

During the electric resistance welding process, the welding electrode 100 contacts the weld face 106. Furthermore, the weld face 106 is pressed axially against the work piece 101 in order to disrupt the oxide film 121 on the work piece 101 and provide improved electrical conductivity between the welding electrode 100 and the work piece 101. More particularly, a first actuator 123 (schematically shown in FIG. 2) applies a first axial force P1 to the welding electrode 100 to drive the weld face 106 axially against the oxide film 121 and work piece 101. Furthermore, the first actuator 123 applies a first rotary force V1 to the welding electrode 100 to further drive the serrates 108 into the oxide film 121 to further disrupt the oxide film 121. It should be appreciated that the first rotary and axial forces V1, P1 may be applied at the same or different times than one another, and for the same or different predetermined time intervals to provide a desired disruption of the oxide film 121 on the work piece 101. Furthermore, the first rotary and axial forces V1, P1 may be at various ranges.

It should be appreciated that the area of disrupted oxide film 121 is dependent on the density of the serrates 108. Because a higher density of serrates 108 is formed at the center 107 of the weld face 106 than at the edge 109 of the weld face 106, a greater area of the oxide film 121 is disrupted proximate to the center 107 than at the edge 109. The increased density of the welding current in the center region 110 of the weld face 106 allows a concentrated and strong weld nugget to be formed on the workpiece 101 proximate to the center region 110. It should be appreciated because of the radially extending arrangement of the serrate 108, the center 107 of the weld face 106 includes the same number of serrates 108 as the edge 109 of the weld face 106. Additionally, the serrates 108 are circumferentially more narrow adjacent to the center 107 than at the edge 109. The higher density of serrates 108 formed in the center region 110, the larger the area of disrupted film located proximate to the center region 110. This area will conduct higher density of the weld current and locate a nugget core. Additionally, higher electrical conductivity decreases pick-up oxide into the welding electrode 100. Pick-up oxide can damage the weld face 106. The better the electrical conductivity, the less electrical resistance will be present, resulting in a lower heat distribution in this area. Lower heat distribution results in an increased life span of the welding electrode 100.

It should be appreciated that the serrates 108 may have sharp edges, flat surfaces, or both to disrupt the oxide film 121 and form a weld. For example, if the oxide film is dense, the weld face 106 has a higher density of serrates 108B in the center region 110. The serrates 108 may include additional and/or fewer patterns and are not limited to those illustrated in FIG. 2A-2C, 3B or 4B.

Figure 6:
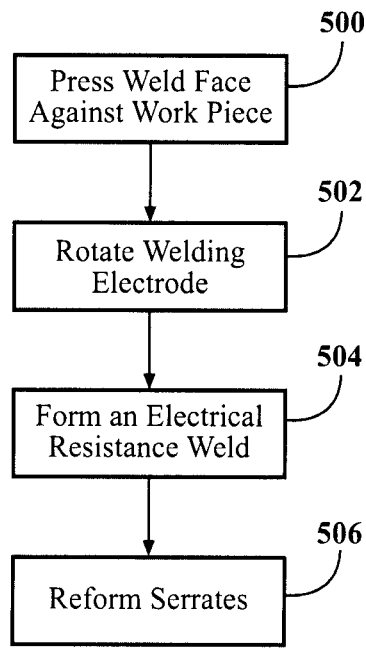
FIG. 6 is a flow diagram illustrating a method of forming an electrical resistance weld.
Figure 7:
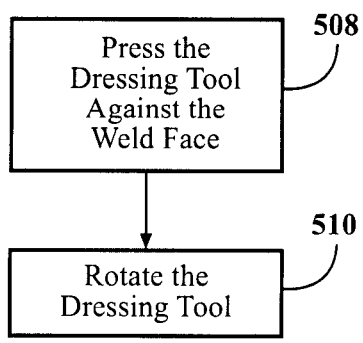
FIG. 7 is a flow diagram illustrating a method of forming or reforming radial serrates on a weld face of a welding electrode.

As best presented in FIG. 6, a method of using such a welding electrode 100 for electric resistance welding on a work piece 101 is provided. The method includes 500 pressing the weld face 106 axially against the work piece 101 to drive the serrates 108 against the work piece 101. Such pressing may be provided by the first axial force P1 being applied against the welding electrode 100 with the first actuator 123. The method further includes 502 rotating the welding electrode about the axis A. Such rotation may be provided by the first rotational force V1 being applied against the welding electrode 100 with the first actuator 123. The method further includes 504 forming an electrical resistance weld on the work piece 101 with the welding electrode 100. Additionally, in the event that the weld face 106 experiences wear or the buildup of oxides thereon, the method includes 506 reforming the serrates 108 on the weld face 106 (discussed in further detail below).

Figure 5:
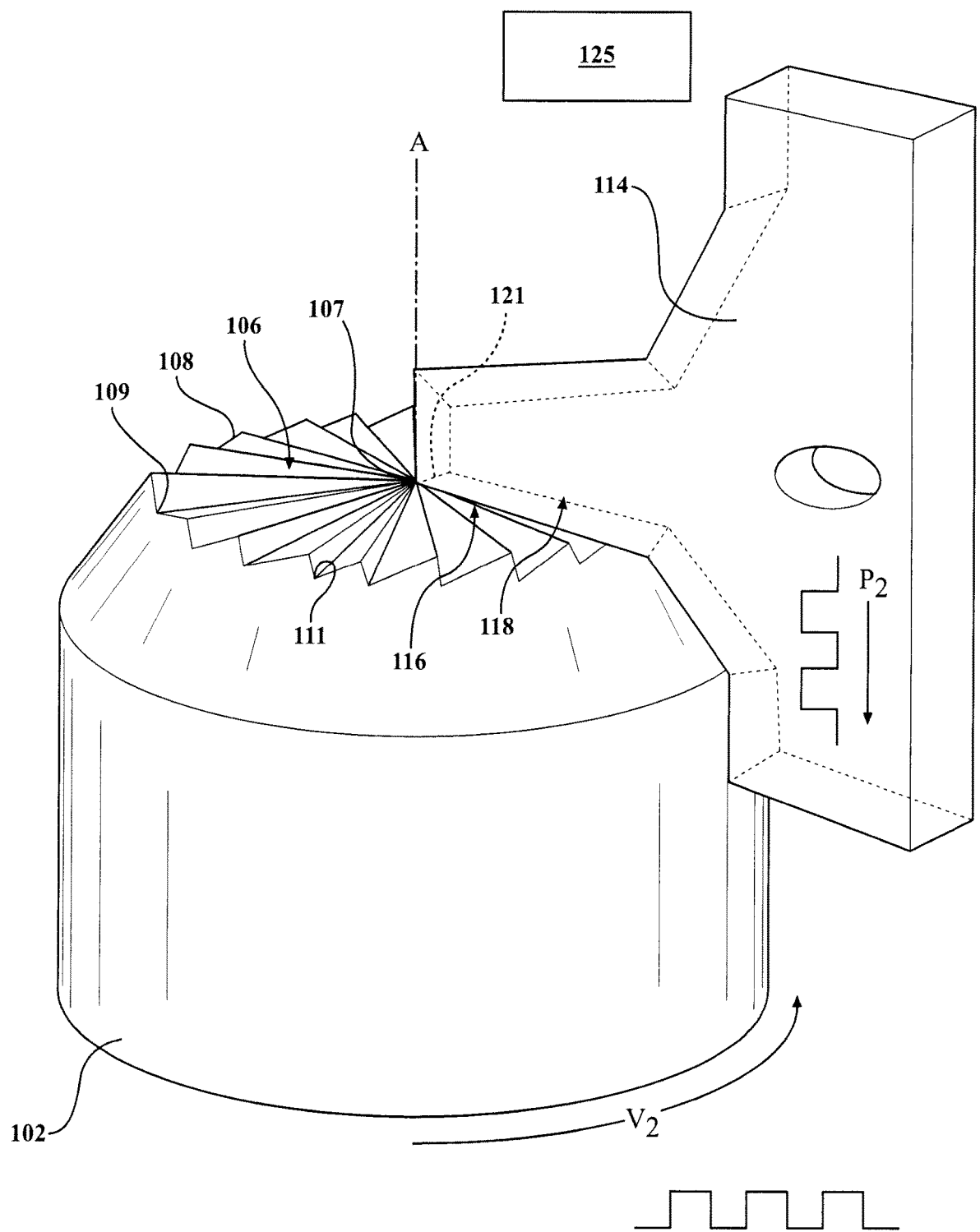
FIG. 5 is a perspective view of a dressing tool for forming or reforming a radial-serrated weld face of a welding electrode.

FIG. 5 illustrates system for forming a radial-serrated weld face 106 of a welding electrode 100 with a higher density of serrates 108 proximate to the center of the welding electrode 100. The system includes a dressing tool 114 that includes a cutting blade 116, for example, a shaped blade. The dressing tool 114 is rotatable about the axis A of the welding electrode 100 such that it can be rotated about the welding electrode 100 with the cutting blade 116 overlying the weld face 106 throughout rotation. During such rotation, a terminal end 121 of the cutting blade is located substantially in axial alignment with the center 107 of the weld face 106 such that even cuts can be made circumferentially about the weld face 106.

The system also includes a second actuator 125 for providing a second axial force P2 against the dressing tool 114 to drive the blade 116 axially against the weld face 106 to form the serrates 108. The second actuator 125 is also configured to provide a second rotary force V2 against the dressing tool 114 to cause the dressing tool 114 to rotate about the welding electrode 100. It should be appreciated that the first and second actuators 123, 125 may be various types of actuators including, but not limited to, manual (unpowered) actuators such as knobs or levers, electric powered motors, gas powered motors, hydraulic actuators, etc.

Accordingly, the subject system provides for forming and reforming of the weld face 106 with serrations 108. It should be appreciated that different dressing tools 114 and/or blades 116 may be utilized to provide serrates with different dimensions. It should also be appreciated that the second rotary and axial forces V2, P2 may vary and may be applied at the same or different times than one another, and for the same or different predetermined time intervals to provide a desired arrangement of serrates. As such, the subject system may advantageously provide repeatable or differently shaped serrates 108. To extend the life time of the welding electrode 100, a starting point of rotation of the dressing tool 114 is identified so that repeated dressing and re-dressing of the welding electrode 108 can be accomplished using an identical (synchronized) serrate.

As illustrated in FIG. 5, during operation, the dressing tool 114 contacts the welding electrode 100, for example, at a portion of the body 102, the head 104, and the weld face 106, such that the cutting blade 116 contacts the weld face 106. The cutting blade 116 rotates about the welding electrode 100 as a result of the second rotary force V2, and the cutting blade 116 drives into the weld face 106 as a result of the second axial force P2 to cut out and form the serrates 108 on the weld face 106.

It should be appreciated that after extensive use of the welding electrode 100, the weld face 106 may have to be reformed. Specifically, the weld face 106 may degrade or include a buildup of deposited material, and thus be less effective in removing the oxide film 121. Accordingly, the subject system includes the step of reforming the serrates on the weld face 106 after degradation thereof, such as by use of the aforementioned dressing tool 114.

In view of the foregoing, a method for forming or reforming a radial-serrated shape in a weld face 106 of a welding electrode 100 is provided. The method includes 508 pressing the dressing tool 114 axially against the weld face 106. Such pressing may be provided by the second axial force P2 from the second actuator 125. The method further includes 510 rotating the dressing tool 114 about the welding electrode 100. Such rotation may be provided by the second rotational force V2 provided by the second actuator 125. As discussed above, it should be appreciated that the axial and rotational movement of the dressing tool may be provided in pulses at various time intervals, and at the same or different times than one another.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A welding electrode for an electric resistance welding process, comprising:
   a body extending along a center axis and terminating axially at a weld face for contacting a work piece;
   the weld face defining a center and a circumferential outer edge; and
   a plurality of serrates defined along the weld face, each of the serrates comprised of a pair of walls each being planar and each extending from the center to the circumferential outer edge of the weld face in the radial direction and extending between a valley and a peak in the axial direction, wherein each of the walls shares one of the valleys with another of the walls and shares one of the peaks with another of the walls, and wherein at least one of the walls of each of the serrates widens circumferentially as the at least one of the walls extends from the center of the weld face to the circumferential outer edge of the weld face.

2. The welding electrode as set forth in claim 1 wherein a tapered head is defined axially between the body and the weld face, wherein the tapered head extends axially and tapers radially inwardly between the body and the weld face such that a first diameter of the body is larger than a second diameter of the weld face.

3. The welding electrode as set forth in claim 1 wherein the weld face is axially spherically crowned.

4. The welding electrode as set forth in claim 1 wherein the body of the welding electrode is generally cylindrical shaped.

5. The welding electrode as set forth in claim 1 wherein one of the walls of each of the serrates extends parallel to the center axis.

6. The welding electrode as set forth in claim 1 wherein the entire circumferential outer edge of the weld face is comprised of the serrates.

7. The welding electrode as set forth in claim 1, wherein each of the peaks is defined by a sharp edge.

8. A method for electric resistance welding on a workpiece, the method comprising:
   providing a welding electrode comprising a body extending about and along an axis and terminating axially at a weld face defining a center and a circumferential outer edge, having a plurality of serrates defined along the weld face, each of the serrates comprised of a pair of walls each being planar and each extending from the center to the circumferential outer edge of the weld face in the radial direction and extending between a valley and a peak in the axial direction, wherein each of the walls shares one of the valleys with another of the walls and shares one of the peaks with another of the walls, and wherein at least one of the walls of each of the serrates widens circumferentially as the at least one of the walls extends from the center of the weld face to the circumferential outer edge of the weld face;
   pressing the weld face axially against the work piece to drive the serrates against the work piece to disrupt an oxide film on the work piece; and
   forming an electrical resistance weld on the work piece with the welding electrode.

9. The method for using a welding electrode as set forth in claim 8 further including rotating the welding electrode about the axis to further disrupt the oxide film on the work piece.

10. The method for using a welding electrode as set forth in claim 9 wherein the welding electrode is rotated at the same time as the pressing of the weld face axially against the work piece.

11. The method for using a welding electrode as set forth in claim 9 wherein rotating the welding electrode about the axis includes pulsing the welding electrode at predetermined time intervals.

12. The method for using a welding electrode as set forth in claim 8 further including reforming the serrates on the weld face.

13. The method for using a welding electrode as set forth in claim 8, wherein one of the walls of each of the serrates extends parallel to the axis.

14. The method as set forth in claim 8, wherein each of the peaks is defined by a sharp edge.

15. A system for forming a weld face of a welding electrode, comprising:
   a dressing tool being rotatable about an axis and having a blade configured to overlie the weld face of the electrode; and
   an apparatus coupled with the dressing tool and configured to apply a pulsing force in a rotary direction about the axis to the dressing tool and configured to apply an axial force against the dressing tool to cause the blade to engage and form serrates on the weld face, wherein the serrates are each comprised of a pair of walls each being planar and each extending from a center to a circumferential outer edge of the weld face in the radial direction and extending between a valley and a peak in the axial direction, wherein each of the walls shares one of the valleys with another of the walls and shares one of the peaks with another of the walls, and wherein at least one of the walls of each of the serrates widens circumferentially as the at least one of the walls extends from the center of the weld face to the circumferential outer edge of the weld face.

16. The system as set forth in claim 15, wherein each of the peaks is defined by a sharp edge.

17. A method for forming or reforming a radial-serrated shape in a weld face of a welding electrode, the welding electrode extending about and along an axis and terminating axially at the weld face, the method comprising:
   rotating a dressing tool about the axis a plurality of times in a pulsing manner to cause the dressing tool to rotate relative to the welding electrode; and
   pressing the dressing tool axially against the weld face of the welding electrode a plurality of times in a pulsing manner between each of the rotational pulses to drive the dressing tool against the weld face to form serrates on the weld face, wherein the serrates are each comprised of a peak projecting axially between two valleys, the peaks of the serrates each extending linearly in a radial direction toward the outer edge of the weld face, and wherein a circumferential width between the valleys of each of the serrates widens as the serrates extend radially outwardly.

18. The method as set forth in claim 17 wherein rotating the dressing tool about the axis in a pulsing manner includes pulsing the dressing tool at a predetermined time interval.

* * * * *